(12) United States Patent
Alioto et al.

(10) Patent No.: US 7,116,235 B2
(45) Date of Patent: Oct. 3, 2006

(54) INVERSE RATIO OF GAMMA-RAY AND NEUTRON EMISSIONS IN THE DETECTION OF RADIATION SHIELDING OF CONTAINERS

(75) Inventors: John I. Alioto, St. Helena, CA (US); Kenneth Greer, Los Altos Hills, CA (US)

(73) Assignee: Veritainer Corporation, St. Helena, CA (US)

( * ) Notice: Subject to any disclaimer, the term of this patent is extended or adjusted under 35 U.S.C. 154(b) by 17 days.

(21) Appl. No.: 10/897,612

(22) Filed: Jul. 23, 2004

(65) Prior Publication Data

US 2005/0275545 A1 Dec. 15, 2005

Related U.S. Application Data

(63) Continuation-in-part of application No. 10/356,154, filed on Jan. 31, 2003, now Pat. No. 6,768,421, and a continuation-in-part of application No. 10/600,307, filed on Jun. 19, 2003, now Pat. No. 7,026,944.

(51) Int. Cl.
*G08B 17/12* (2006.01)

(52) U.S. Cl. .................... 340/600; 340/603; 378/57; 378/62

(58) Field of Classification Search ................ 340/600, 340/603, 854.1, 854.6, 856.3, 539.1, 539.26, 340/539.29, 3.1; 378/57, 62, 69; 250/336.1, 250/358.1, 363.01, 390.01, 390.04; 376/159, 376/161
See application file for complete search history.

(56) References Cited

U.S. PATENT DOCUMENTS

| 5,373,538 | A  | * | 12/1994 | Grenier et al. | 376/159 |
| 5,838,759 | A  | * | 11/1998 | Armistead | 378/57 |
| 6,891,470 | B1 | * | 5/2005 | Bohinc, Jr. | 340/539.26 |
| 6,924,487 | B1 | * | 8/2005 | Bolozdynya et al. | 250/390.01 |
| 6,936,820 | B1 | * | 8/2005 | Peoples | 250/336.1 |

* cited by examiner

*Primary Examiner*—Van T. Trieu
(74) *Attorney, Agent, or Firm*—Anthony T. Cascio

(57) ABSTRACT

The presence of radiation shielding material concealing illegitimate content in a container is detected by obtaining each of measured gamma-ray data and measured neutron data from the container, and comparing the measured gamma-ray and neutron data to expected gamma-ray and neutron data. An anomaly between the measured data and the expected data is an indicum of the presence of such material shielding such illegitimate content.

55 Claims, 5 Drawing Sheets

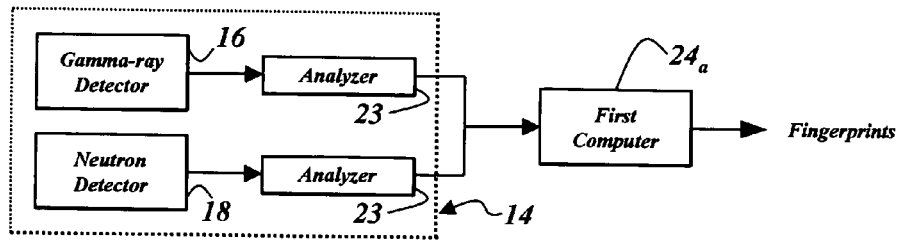
Fig. 3
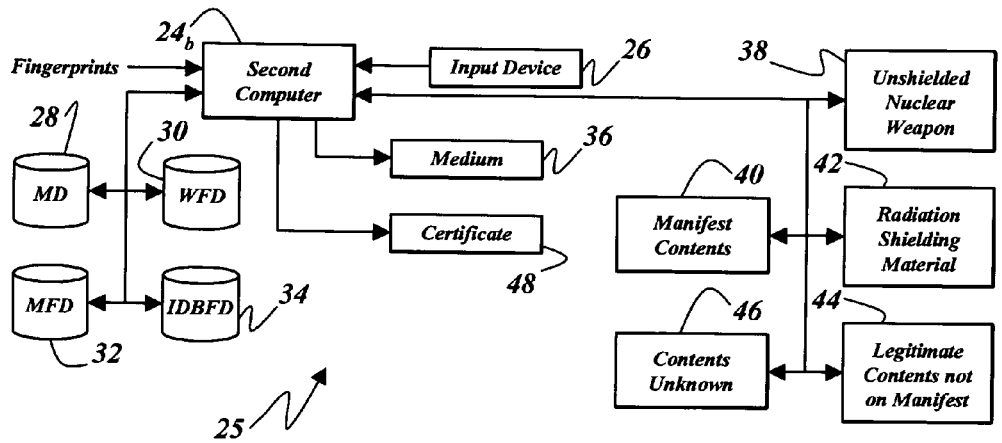
Fig. 4
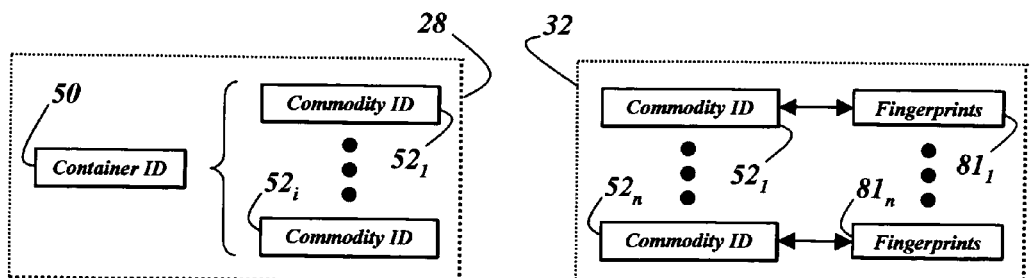
Fig. 4A          Fig. 4B

INVERSE RATIO OF GAMMA-RAY AND NEUTRON EMISSIONS IN THE DETECTION OF RADIATION SHIELDING OF CONTAINERS

RELATED APPLICATION DATA

The present application is a continuation-in-part of and claims priority from the commonly owned, applications for patent having at least one inventor in common herewith entitled "Container Crane Radiation Detection Systems and Methods," Ser. No. 10/356,154, filed Jan. 31, 2003 (the '154 Application), now U.S. Pat. No. 6,768,421, and "Apparatus and Method for Detecting Radiation and Radiation Shielding in Containers," Ser. No. 10/600,307, filed Jun. 19, 2003 (the '307 Application) now U.S. Pat. No. 7,026,944, the specifications of which are incorporated herein by reference.

BACKGROUND OF THE INVENTION

1. Field of the Invention

The present invention is directed to the detection of radiation shielding material in a container, and, more particularly, to the detection of such material using an inverse ratio of gamma-ray to neutron radiation emission from a given container.

2. Background of the Art

In the post World War II era, global tensions festered and resolved within an environment dominated by the tremendous destructive capability of nuclear weapons that could kill millions of people and destroy large metropolitan areas in a single, momentary event. For several decades after 1945, a handful of nations, generally aligned within a bipolar world order, engaged in the proliferation of these weapons, continually increased the destructive capability of each warhead and refined delivery systems capable of launching a near instantaneous annihilative force with unprecedented stealth and accuracy.

Yet, despite the unprecedented military power ever possessed by a single nation state, the sheer magnitude of the mutual destruction that would result from the initiation of an attack by one state upon another, and the equally destructive response which would ensue, using these weapons prevented their very use. This concept of mutually assured destruction provided the delicate balance in the bipolar alignment of world order that, irrespective of the ever-increasing magnitude of destructive force on each side, such force would never be used.

Presently, however, that delicate balance has been lost. The collapse of bipolarity and the emergence of unipolarity have resulted in the emergence of rogue nations and terrorists as the primary threat to world order. Rogue nations generally comprise small quasi-failing states that have either developed nuclear weapons or have active nuclear weapons programs in progress. Terrorists are small non-national groups who use random and wanton destruction of human life and property to create fear and panic in the civilian population for political gains. In either event, rogue nations and terrorists are increasingly capable of buying nuclear weapons technology on the world's black-market. Once in possession of nuclear weapons, either merely needs a method of delivery to cause great harm.

As set forth in the '154 and '307 Applications, the Sep. 11, 2001 attack on the New York World Trade Center by a terrorist group known as al Qaeda was a wake-up call for the nations of the world. People suddenly realized that their countries and nations were vulnerable to attack by using the common transport mechanisms of global commerce as a weapons delivery system or as the weapons themselves. Accordingly, these transport mechanisms have been subject to increased monitoring and more stringent security measures to minimize the chances of weapons delivery. However, the magnitude of the increase in monitoring or of the stringency of security measures is inherently limited so that such monitoring and measures do not disadvantageously choke the stream of commerce thereby potentially resulting in economic disruption and instability. Such disruption and instability would nonetheless achieve the aims of the terrorist even if no further weapons were ever delivered.

One of the basic transport mechanisms of the modern global economy is containerized shipping. Through seaports and border crossings, shipping containers freely move in and out of the nations of the world with little or no inspection of their contents. For example, as of February 2004, the United States Government admits that ninety-five percent (95%) of the some 30,000 shipping containers that enter U.S. ports every day are not inspected in any way. The same is true of the millions of shipping containers annually brought into the United States across its borders with Canada and Mexico.

This lack of inspection extends in even greater percentages to the some 200 million shipping containers that move in and out of the ports, and over the roads and rails, of the nations of the world every year. It has now been clearly recognized that rogue nations or terrorists could potentially deliver a nuclear weapon by stealth in a shipping container destined for a particular population center.

One way to prevent the delivery of a nuclear weapon by stealth is to physically inspect each and every shipping container as it moves through all of the major transit points, that is at each highway entrance and exit, border crossing, airport and seaport. But large scale, invasive inspections are not economically feasible. Such rigorous inspections would result in the aforementioned disruption and instability, thereby achieving the very goal of the terrorists. Accordingly, there has been developed various methods and apparatus, as disclosed in the '154 and '307 Applications, for alternative, non-invasive "on the fly" inspection of shipping containers at the major transit points of world trade.

a. Active Versus Passive Systems and Methods

A nuclear weapon, whether designed to destroy through the explosive release of nuclear energy or through the spread of nuclear material by conventional explosive force, contains a radioactive or fissile material. As is known, radioactivity is the spontaneous emission of radiation. This radiation occurs either directly from unstable atomic nuclei or as a consequence of a nuclear reaction, and comprises alpha particles, nucleons (protons and neutrons), electrons and gamma rays. This radiation can be detected through active or passive systems and methods.

As described in the '154 and '307 applications, gamma rays emitted by radioactive or fissile material in a shipping container can be detected by various types of radiation detection devices. It is also well known in the art that neutrons emitted by radioactive or fissile material in a shipping container can be detected by various radiation detection devices. See, e.g., Perkins et al., Method and apparatus for detecting neutrons, U.S. Pat. No. 5,680,423 ("Perkins et al.").

Active radiation detection involves (1) a source of radiation, e.g., x-rays or neutrons; (2) a radiation detection device; and, (3) in most schemes, the placement of the suspect container (or target object) between the source and the detection device in the path of the radiation emanating from the source. See, e.g., Armistead, Single Beam Photoneutron Probe And X-Ray Imaging System for Contraband Detection and Identification, U.S. Pat. No. 5,838,759. In the active system or method, the source of radiation illuminates or is focused at the container either to (1) cause a shadow of the shipping container contents to be cast on the detector (as in medical x-ray or tomography imaging); or (2) cause the target objects in the container to give off other types of radiation which are then detected by the detector.

There is an inherent fundamental problem with the known active, non-invasive detection systems and methods. The radiation source that illuminates or is focused upon the container gives off radiation which is itself harmful to people and property. As stated in the '307 Application: "Active detection systems (1) produce harmful radiation and thus are not suitable for the work environment; (2) can damage certain types of cargo carried in containers such as photographic film; (3) require a separation space between the radiation source and the detector into which space the inspected container must be placed; and, (4) are difficult to accommodate on the hoist attachment of the container crane."

Passive detection systems, as of the type described in the '154 and '307 Applications, do not rely upon any source of radiation, but instead assess the contents of the container by reliance upon the radiation spectrum or energy detected. As described therein, an unexpected spectrum or energy could be used to subject the container to further non-invasive or invasive inspection.

b. Shielded and Unshielded Nuclear Weapons

An unshielded nuclear weapon in a shipping container can be detected by many gamma-ray and neutron detection systems and methods. As pointed out in the '154 and '307 Applications, as early as 1911, Geiger-Mueller counters were available to detect the presence of ionizing radiation. Most modern, passive radiation detection devices utilize scintillators to detect the count and energy of the gamma rays. Among other things, gas filled chambers are used to detect the presence of neutrons. For an example of detection of unshielded radiation, "portal monitors" are radiation detectors mounted on a squared-off A-frame structure. A shipping container is driven through the portal monitor. The container thereby comes into proximity to the radiation detectors and they detect the presence of the radiation by virtue of the gamma-ray and/or neutron emissions from the container.

However, as also pointed out in the '154 and '307 Applications, it is well know in the art that matter significantly attenuates gamma rays. For example, two to three inches of lead surrounding, for example, forty (40) pounds of highly enriched uranium ("HEU") will almost entirely attenuate the gamma-ray emissions of the HEU. Any rogue nation or terrorist clever and resourceful enough to acquire a nuclear weapon in the first place will know that the best way to deliver it by stealth is to shield it. Consequently, there exists a need for improved methods and apparatus for passive non-invasive inspection of shipping containers that will detect the presence of radiation shielding material concealing impermissible quantities of radioactive or fissile material in a shipping container.

SUMMARY OF THE INVENTION

Accordingly, it is an object of the present invention to provide such improved methods and apparatus for passive non-invasive inspection of shipping containers that will detect the presence of radiation shielding material concealing impermissible quantities of radioactive or fissile material in a shipping container. It is a further object of the present invention that such inspection be performed "on the fly."

According to the present invention, the presence of radiation shielding material concealing illegitimate content in a container is detected by obtaining each of measured gamma-ray data and measured neutron data from the container, and comparing the measured gamma-ray and neutron data to expected gamma-ray and neutron data wherein an anomaly between the measured data and the expected data is an indicum of the presence of such material shielding such illegitimate content.

A feature of the present invention is that conventional devices, which detect the spontaneous gamma-ray and neutron emissions from a container, are configured such that a comparison of a ratio of the spontaneous emissions to an expected ratio advantageously eliminates a separate source of radiation during inspection such that the system is truly non-invasive and passive. The separate source of radiation is not desirable because, among other things, it may be harmful to human beings and thus unacceptable in the work environment. The radiation, including X-rays, can also be harmful to some contents in the container.

Another feature in one particular embodiment of the present invention is that such inspection may be performed "on the fly" while the container is being moved, for example being loaded or unloaded from a container ship or container rail car. This "on the fly" aspect of the present invention advantageously allows for rigorous inspections of the containers while simultaneously eliminating the disruption and instability that such rigorous inspection may other wise entail.

These and other objects, advantages and features of the present invention will become readily apparent to those skilled in the art from a study of the following Description of the Exemplary Preferred Embodiments when read in conjunction with the attached Drawing and appended Claims.

BRIEF DESCRIPTION OF THE DRAWINGS

FIG. 3 is a block diagram of a gamma-ray and neutron detector system to collect gamma-ray and neutron data;

FIG. 4 is a diagram of a terminal operating system constructed in accordance with the principles of the present invention;

DESCRIPTION OF THE EXEMPLARY PREFERRED EMBODIMENTS

Figure 1:
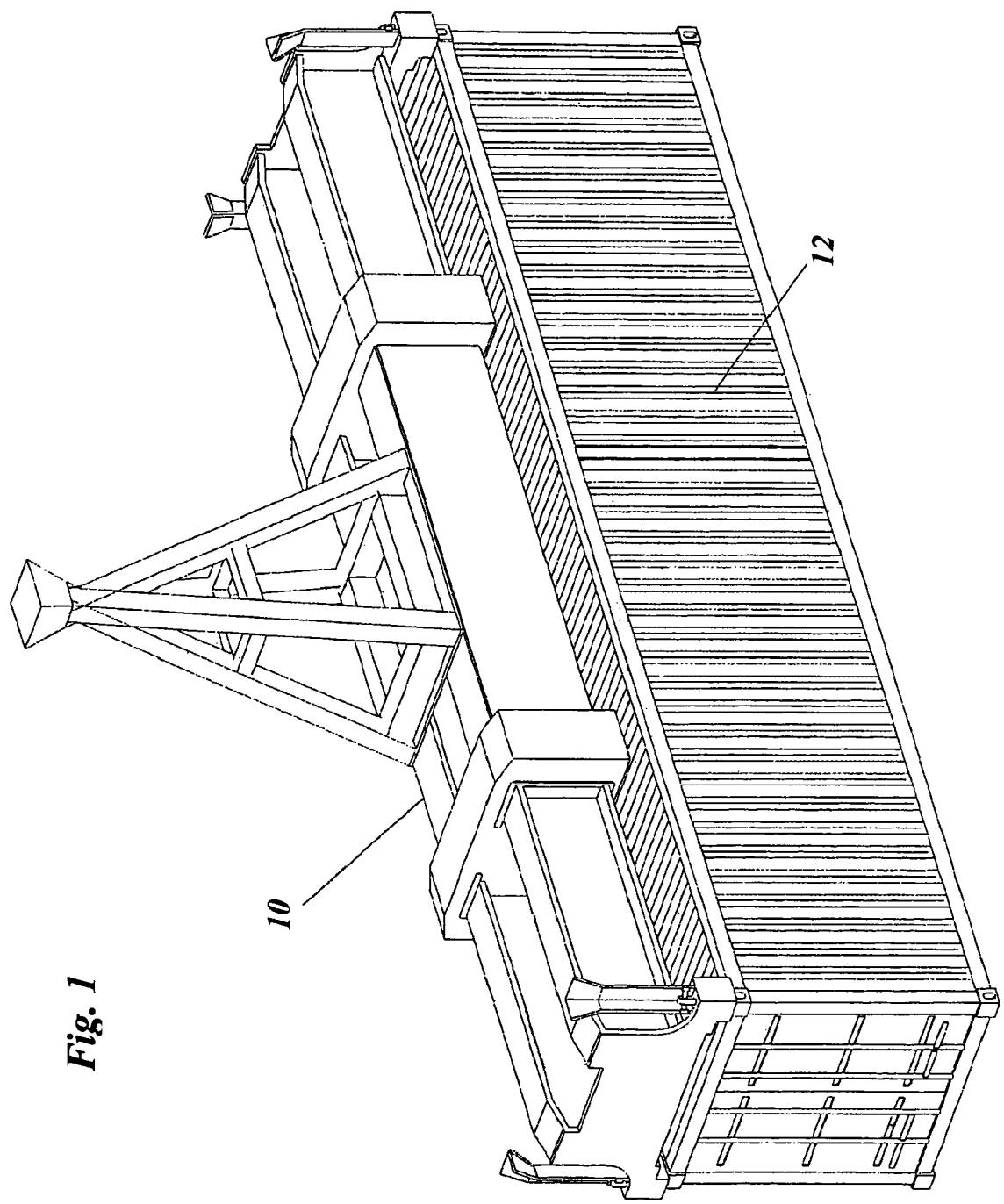
FIG. 1 is a perspective view of a hoist attachment of a container crane engaging a shipping container.
Figure 2:
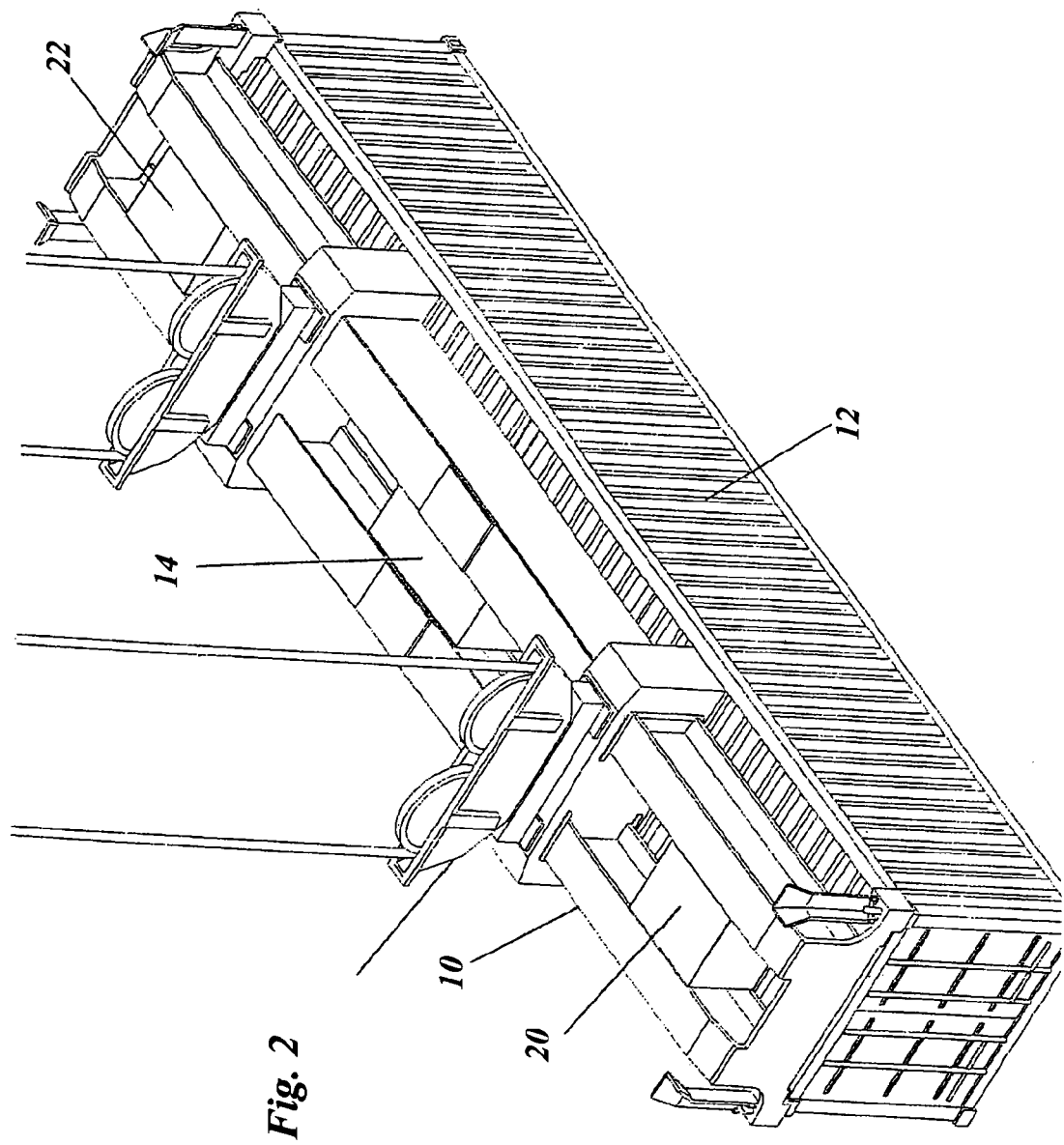
FIG. 2 is another perspective view of the hoist attachment of FIG. 1 showing a plurality of housings added thereto between the spreader bars of the hoist attachment.

Referring now to FIGS. 1–2, there is shown a hoist attachment 10 and a container 12 being carried by the hoist attachment 10 in a conventional manner. The hoist attachment 10 is of the type typically used with a container crane, although any type of hoist attachment may be used. The hoist attachment 10 is adapted to carry at least one housing 14.

With further reference to FIG. 3, the housing 14 includes therein at least one gamma-ray detector 16 and at least one neutron detector 18, each of which may be a commercially available detector. The gamma-ray detector 16 and the neutron detector 18 are disposed in the housing 14 to be proximal the container 12 when engaged by the hoist attachment 10 and further arranged therein to detect respectively the gamma-ray and neutron emissions from the container 12 when so engaged.

The hoist attachment 10 may further include additional housings 20, 22, similar to housing 14, each of which may also include at least one gamma-ray detector 16 and neutron detector 18. The number of all such housings may be selected based on such criteria as the size or type of either or both of the hoist attachment 10 or the container 12. Alternatively, when multiple housings are used, each housing need not contain both the gamma-ray detector 16 and the neutron detector 18 as long as both types of detectors are present for detecting both types of emissions from the container 12.

The housing 14, along with the further housings 20, 22 may be placed in different locations on the hoist attachment 10 depending on its configuration. For example, on a container crane hoist attachment with a tub area in the middle with forty and forty five foot extensions, the housing 14 may be placed underneath the tub area and additional housings such as the housings 20, 22, placed within the spreader bars of the extensions. In general, a sufficient number of housings are placed with detectors therein such that the range of the detectors reaches the entire area of the container.

As also seen in FIG. 3, each of the gamma-ray detector 16 and the neutron detector 18 may further be operatively coupled to a respective one of multi-channel analyzer 23, for example a MCA-8000A or DP4 commercially available from Amptek Inc. (www.amptek.com) or Canberra Industries Inc. (www.canberra.com). The output of each analyzer 23 may be operatively coupled to a first conventional computer 24a, such as a PC.

Typically, the gamma-ray detector 16, the neutron detector 18 and each analyzer 23 are disposed within the housing 14. The housing 14, and any additional housings such as the housings 20, 22, are mounted to the hoist attachment 10 and have the gamma-ray detector 16, the neutron detector 18 and each analyzer 23 mounted therein in a manner such that the gamma-ray detector 16, the neutron detector 18 and each analyzer 23 are preferable isolated from mechanical shock induced in the hoist attachment 10. On container cranes of the type that include a machinery room, the first computer 24a may preferably be disposed within such machinery room. Known wire or wireless interfaces are provided such that the output of each analyzer 23 is fed into and read by the first computer 24a.

The gamma-ray detector 16 and the neutron detector 18 are respectively operative to develop gamma-ray data and neutron data from the detected gamma-ray emissions and detected neutron emissions from the container 12. The data developed by the gamma-ray detector 16 and the neutron detector 18 may be a measure of one of either, or both of, (1) the count of the gamma rays and neutrons emanating from the container 12, and (2) the energy of the gamma rays and neutrons emanating from the container 12. When data collection and measurement is being performed "on the fly," the data from the gamma-ray detector 16 and the neutron detector 18 is preferably obtained when the container 12 is engaged by the hoist attachment 10.

The collected and measured data from the gamma-ray detector 16 and neutron detector 18 may be applied to each respective analyzer 23, which in turn digitizes such data. The digitized gamma-ray and neutron data from each analyzer 23 is in turn applied to the first computer 24a at which such data is temporarily stored. The digitized data developed from the detected gamma-ray and neutron emissions will hereinafter be respectively referred to as the gamma-ray fingerprint and neutron fingerprint, which may also be collectively referred to as the "radiation fingerprint" or simply the "fingerprint" of the container 12. Modernly, those skilled in the art may also refer to the gamma-ray fingerprint and the neutron fingerprint as the "gamma-ray template" or "neutron template." Any fingerprint may also be represented as a spectrum, spectrogram or spectrograph.

With further reference to FIG. 4, there is shown a block diagram of a terminal computer system (TCS) 25, which may include, inter alia, a second conventional computer 24b. The second computer 24b is in communication with the first computer 24a through known wired or wireless network links. Although the first computer 24a and the second computer 24b may be the same device, preferably the first computer 24a located in the machinery room of the container crane is used for data collection and transmission, and the second computer 24b, which may therefore be at any location, is used for data analysis. Furthermore, since a typical terminal or port has multiple container cranes in operation, the machinery room of each container crane can have its own first computer 24a, each in communication with a single second computer 24b.

The TCS 25 further includes an input device 26 which may be operatively connected to the first computer 24a, but preferably operatively connected to the second computer 24b, through a know wire or wireless interface. In this way, the container ID of the container 12 under test while engaged by the hoist attachment 10 can be input to the first or second computer 24a or 24b, respectively. The input device 26 may exemplarily be (1) a conventional keyboard for manual entry of the container ID; (2) a known radio frequency transmitter/receiver pair wherein the transmitter broadcasts the container ID from the container 12 which is received by the receiver operatively connected to the first or second computer 24a or 24b; or, (3) a known optical device for scanning a bar code or other optical indicia on the container 12 into the first or second computer 24a or 24b.

The TCS further includes a manifest database 28, a weapon fingerprint database 30, a manifest fingerprint database 32, and an inspection day background fingerprint database 34. The below described content of each of these databases may be locally stored externally at or internally in the second computer 24b, or available to the second computer 24b through a connection over a local or wide area public or private network.

The second computer 24b includes a computer readable medium 36 in which software, when executed by the second computer 24b, implements the below described methods and processes of the present invention. Described in greater detail below, when the container 12 is being inspected the result of such inspection is a return of one of the following statuses: (1) "likely contains an unshielded nuclear weapon," indicated at 38; (2) "likely has the contents said to be in it by the manifest," indicated at 40; (3) "likely contains radiation shielding material that shields a nuclear weapon," indicated at 42; (4) "likely contains legitimate contents that are different than those listed on the manifest" indicated at 44; and, (5) "contents unknown," indicated at 46. These statuses may be indicated in the form of human readable messages on a graphic user interface or display, status indicator lights, alarms or other audible or visual stimuli connected to the second computer 24*b*. If no illegitimate material is found in the container 12, the second computer 24*b* may also be operative to generate a printed certificate 48.

The manifest database 28 is preferably a manifest electronic file or database maintained by customs authorities, the terminal operator or the company that transports the container 12 and its contents. The manifest electronic file for each shipping container is presently required to be electronically submitted to the U.S. Customs via its so-called "Automated Manifest System" ("AMS") at least 24 hours before containers are loaded on ships bound for the United States. There are also pre-notification requirements for trucks, planes or rails bound for the United States. The U.S. Customs requires that each manifest electronic file identify the container 12 by at least its Container ID and each item of the contents therein by a standardized Commodity ID or so-called Harmonized Tariff Code ("HTC") number. HTC numbers may be found at the Harmonized Tariff Schedule on the U.S. International Trade Commission's website at http://www.usitc.gov/wais/reports/arc/w3653.htm.

Accordingly, as best seen in FIG. 4A, the manifest database 28 contains the container ID 50 of the container 12 and each standardized commodity ID $52_{1-i}$ for each item of the contents listed in the manifest cross-referenced to the Container ID 50. It is to be understood that the manifest database 28 may also contain the container ID for other containers with each standardized commodity ID for each item of the contents for such other containers cross-referenced thereto.

Preferably, in the construction of the weapon fingerprint database 30 and the manifest fingerprint database 32, an original background fingerprint of an empty test container, similar to the container 12, is first obtained. Alternatively, the original background fingerprint may be obtained, for example, by averaging an original background fingerprint obtained from each empty test container in a series of empty test containers.

Figure 5:
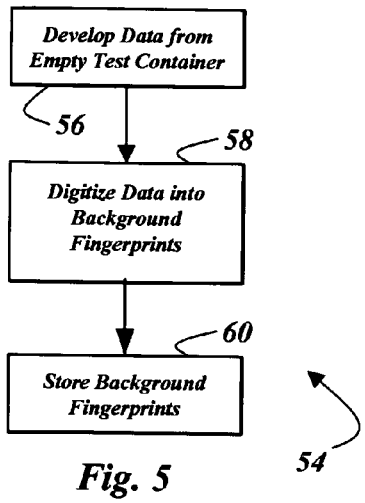
FIG. 5 is a flow chart of a process to develop the original background fingerprint of the container of FIG. 1.

With reference to FIG. 5, there is shown a flow chart 54 of an exemplary preferred method and process to obtain the original background fingerprint of the empty test container. As indicated at step 56, a gamma-ray detector and a neutron detector, each similar to the gamma-ray detector 16 and the neutron detector 18, respectively develop gamma-ray data and neutron data from the detected and gathered gamma-ray emissions and neutron emissions emanating from the empty test container. An analyzer similar to the analyzer 23 digitizes the gamma-ray data and neutron data for the empty test container into both a gamma-ray fingerprint and a neutron fingerprint, as indicated at step 58. At step 60, the gamma-ray fingerprint and the neutron fingerprint for the empty test container are then temporarily stored for later use as the original background fingerprints, or for averaging with the original background fingerprints of the other test containers in the series.

With the original background fingerprints having been obtained, the weapon fingerprint database 30 may now be constructed. Generally, the weapon fingerprint database 30 is constructed from placing a sample of a known, dangerous radioactive material, such as HEU or plutonium, into the test container and obtaining the gamma-ray and neutron fingerprints for the test container with the sample therein. The sample may also include combinations of known, dangerous radioactive or fissile materials. Furthermore, a series of test containers may be used, wherein each of the test containers contains a different sample from each other of the test containers, such that for each sample one pair of fingerprints will be obtained, wherein the pair of fingerprints is one gamma ray fingerprint and one neutron fingerprint.

Figure 6:
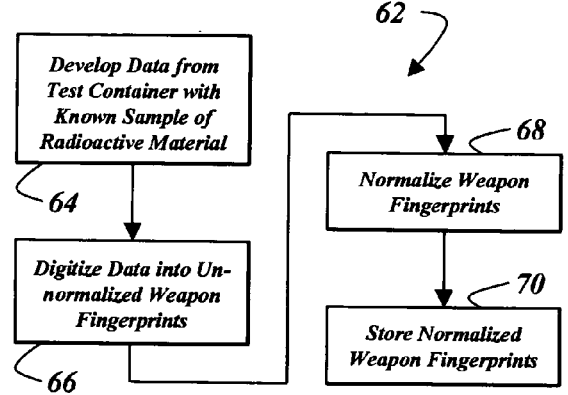
FIG. 6 is a flow chart of a process to develop the weapon fingerprint database of FIG. 4.

With continuing reference to FIG. 6, there is shown a flow chart 62 of an exemplary preferred method and process to construct the weapon fingerprint database 30. As indicated at step 64, the gamma-ray detector and a neutron detector, preferably the same ones used to obtain the original background fingerprint and further preferably in the same environment, respectively develop gamma-ray data and neutron data from the detected and gathered the gamma-ray emissions and neutron emissions emanating from the test container with the sample placed therein. The analyzer similar to the analyzer 23 digitizes the gamma-ray data and neutron data for the sample containing test container into both a gamma-ray fingerprint and a neutron fingerprint, as indicated at step 66, to obtain un-normalized weapon fingerprints of the sample containing test container. At step 68, the un-normalized weapon fingerprints are normalized by subtracting the original background gamma-ray and neutron fingerprints for the test container from the un-normalized gamma-ray and neutron weapon fingerprints obtained at step 66 to obtain the normalized gamma-ray and neutron weapon fingerprints for the sample. Accordingly, the pair of normalized fingerprints for the sample have any influence of the background radiation of the test container removed therefrom.

The normalized weapon fingerprints can then be stored in the weapon fingerprint database 30, as indicated at step 70. Each pair of the normalized gamma-ray and neutron weapon fingerprints may, but need not be, cross-referenced to an identity of the sample used to obtain the particular normalized weapon fingerprint, in which event the identity of the sample is also stored in the weapon fingerprint database 30.

When a series of test containers is used, wherein each test container contains a different sample, in the performance of the normalizing step 68, the original gamma-ray and neutron background fingerprints for a particular test container in the series are subtracted from the un-normalized gamma-ray and neutron weapon fingerprints obtained from this particular container. Alternatively, the original gamma-ray and neutron background fingerprints obtained as an average of all such fingerprints from each test container in the series may be subtracted, respectively, from each un-normalized gamma-ray and neutron weapon fingerprint.

There may be further alternative ways to construct the weapon fingerprint database 30. For example, the gamma-ray and neutron fingerprints of dangerous radioactive materials may be readily available from public sources such as the Nuclear Regulatory Commission or the Atomic Energy Commission or may be calculated using computer simulation and modeling. The readily available or calculated fingerprints may then be used to populate the weapon fingerprint database 30 alone or together with the normalized fingerprints obtained by the methods and processes described for the flowchart 62.

As above with the original background fingerprints having been obtained, the manifest fingerprint database 32 may also now be constructed. Generally, the manifest fingerprint database 32 is constructed from placing an item of known legitimate contents into the test container and obtaining the gamma-ray and neutron fingerprints for the test container with the item therein. The various items of known legitimate contents are those identified by a standard commodity ID and permitted to be carried in a container by shipping authorities such as, for example, the contents listed with their associated commodity ID on the U.S. International Trade Commission's Harmonized Tariff Schedule available at http://www.usitc.gov/wais/reports/arc/w3653.htm. Furthermore, the series of test containers may be used, wherein each of the test containers contains a different sample from each other of the test containers.

Figure 7:
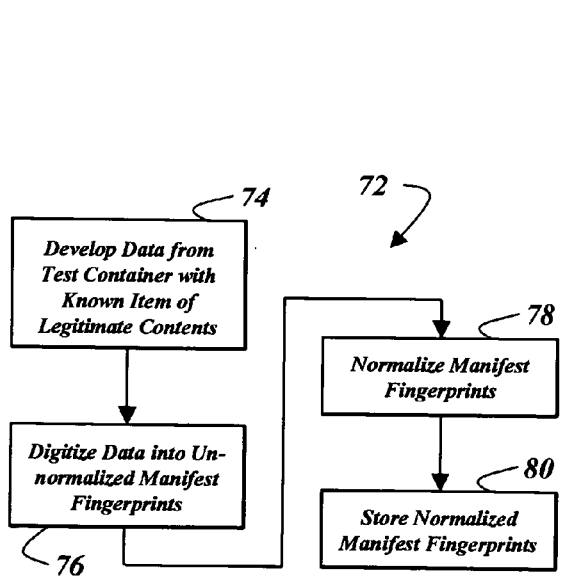
FIG. 7 is a flow chart of a process to develop the manifest fingerprint database of FIG. 4.

With continuing reference to FIG. 7, there is shown a flow chart 72 of an exemplary preferred method and process to construct the manifest fingerprint database 32. As indicated at step 74, the gamma-ray detector and a neutron detector, preferably the same ones used to obtain the original background fingerprint and further preferably in the same environment, respectively develop gamma-ray data and neutron data from the detected and gathered the gamma-ray emissions and neutron emissions emanating from the test container with the item of legitimate contents placed therein. An analyzer similar to the analyzer 23 digitizes the gamma-ray data and neutron data for the legitimate item containing test container into both a gamma-ray fingerprint and a neutron fingerprint, as indicated at step 76, to obtain un-normalized gamma-ray and neutron manifest fingerprints of the legitimate item containing test container. At step 78, the un-normalized manifest fingerprints are normalized by subtracting the original gamma-ray and neutron background fingerprints for the test container from the un-normalized gamma-ray and neutron manifest fingerprints obtained at step 76 to obtain the normalized gamma-ray and neutron manifest fingerprints for the legitimate item. Accordingly, the normalized manifest fingerprints for the legitimate item have any influence of the background radiation of the test container removed therefrom.

The normalized manifest fingerprints can then be stored in the manifest fingerprint database 32, as indicated at step 80, and each preferably cross-referenced to the Commodity ID 52 for such item. Accordingly, as best seen in FIG. 4B, the manifest database 32 contains a list of the standardized Commodity ID $52_{1-n}$ of each item, for which normalized gamma-ray and neutron manifest fingerprints have been obtained as described above, stored along with its respective normalized manifest fingerprints $81_{1-n}$.

When a series of test containers is used, wherein each test container contains a different legitimate item, in the performance of the normalizing step 78, the original gamma-ray and neutron background fingerprints for a particular test container in the series are subtracted from the un-normalized gamma-ray and neutron manifest fingerprints obtained from this particular container. Alternatively, the original gamma-ray and neutron background fingerprints obtained as an average of all such fingerprints from each test container in the series may be subtracted, respectively, from each un-normalized gamma-ray and neutron manifest fingerprint.

It should be noted that the various items of the known legitimate contents sometimes will (1) not emit any gamma rays or neutrons, or (2) only attenuate background radiation (i.e., decrease the intensity/energy of the radiation as it passes into and, perhaps, through matter), or both. In such event, the resulting normalized gamma-ray or neutron manifest fingerprint for any such item will be less than its corresponding original gamma-ray or neutron background fingerprint. The normalized gamma-ray or neutron manifest fingerprint of each item of known legitimate container content may thus be a negative value or measured by its difference from the corresponding original gamma-ray or neutron background fingerprint.

It should also be noted that there is a formula for the attenuation of gamma rays and neutrons in matter. The formula will permit anticipation of the manifest fingerprint for an item wherein the process of flowchart 72 has not been performed and where the following information is known: (1) the thickness and consistency of the container wall; (2) the thickness and consistency of the container contents; and, (3) the count and energy of the radiation being attenuated. The thickness and consistency of a shipping container is standardized. The ship's manifest should contain information as to the thickness and consistency of the cargo content of the shipping container. And the count and energy of the radiation being attenuated is known through the use of an inspection day background fingerprint described immediately below.

The inspection day gamma-ray and neutron background fingerprints are obtained similarly as described above with respect to the original background fingerprints. Whereas the original background fingerprints are obtained to remove the influence of the background radiation of the test container from the above described weapon fingerprints and the manifest fingerprints, the inspection day background fingerprints are obtained from one or more test containers preferably on the same day as the inspection of the container 12 described infra to remove the influence of the background gaznina-ray and neutron emissions from the gamma-ray and neutron fingerprints obtained from inspection of the container 12. The inspection day background fingerprints are also used, as described infra, to detect the presence of shielding material concealing illegitimate contents in the container 12.

Accordingly, inspection day gamma-ray and neutron background fingerprints are preferably obtained using the same gamma-ray detector 16 and the same neutron detector 18 as will be used for the later inspection of the container 12. Those skilled in the art will recognize that the constituent gamma-ray data of the inspection day gamma-ray background fingerprint is primarily developed from background gamma-ray emissions from the ground and passing upward through the test container toward the gamma-ray detector 16, and that the constituent neutron data of the inspection day neutron background fingerprint is primarily developed from neutron emissions coming from the sky and backscattered from the test container toward the neutron detector 16. The inspection day background fingerprints may also obtained from a single empty test container or a series of empty test containers in which event the gamma-ray and neutron fingerprints for all such containers in the series are averaged or otherwise combined.

Figure 8:
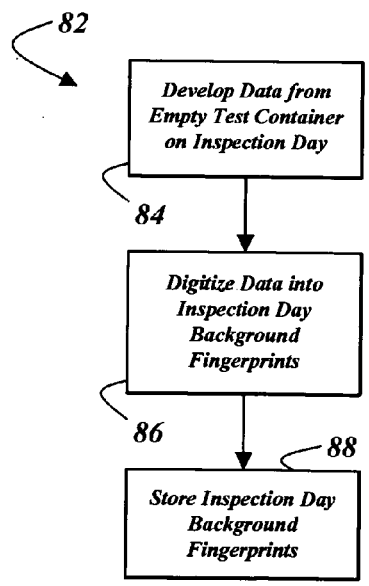
FIG. 8 is a flow chart of a process to develop the inspection day background fingerprint database of FIG. 4.

With reference to FIG. 8, there is shown a flow chart 82 of an exemplary preferred method and process to obtain the inspection day gamma-ray and neutron background fingerprints of the empty test container. As indicated at step 84, the gamma-ray detector 16 and the neutron detector 18 respectively develop gamma-ray data and neutron data from the detected and gathered the gamma-ray emissions and neutron emissions emanating from the empty test container. The analyzer 23 coupled to the gamma-ray detector 16 and the neutron detector 18 digitizes the gamma-ray data and neutron data for the empty test container into both a gamma-ray fingerprint and a neutron fingerprint, as indicated at step 86.

At step 88, the gamma-ray fingerprint and the neutron fingerprint for the empty test container are then temporarily stored for later use as the inspection day gamma-ray and neutron background fingerprints, or for averaging with the inspection background fingerprints of the other test containers in the series. In any event, the resultant inspection day fingerprints to be used are preferably stored in the inspection day background fingerprint database 34.

With the above described databases having been constructed and populated, inspection of the container 12 may be performed. Complete inspection of the container 12 may preferably involve four separate tests, although any one of the tests may be used by itself or in any combination with any of the other three tests and in any order. Generally these tests may be referred to as a weapon test, a manifest test, a background radiation test and an equivalence radiation test.

Figure 9:
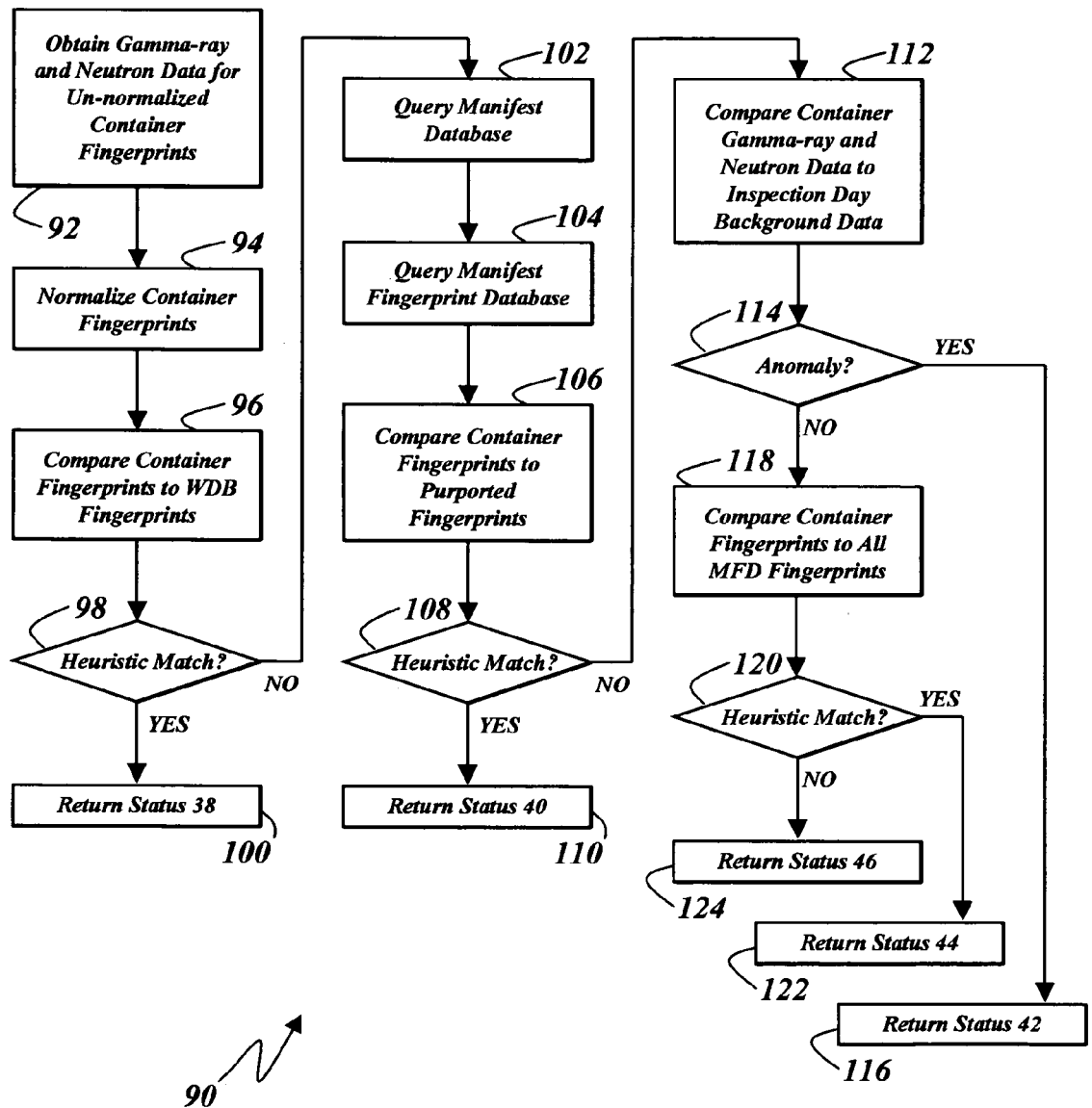
FIG. 9 is a flow chart of a process implemented in accordance with the principles of the present invention.

With reference now to FIG. 9, there is shown a flowchart 90 of the exemplary preferred methods and processes to inspect the container 12 using the four above mentioned tests. In a preferred embodiment of the present invention, these tests are performed while the container 12 is engaged by the hoist attachment 10 such that inspection of the container 12 is performed non-invasively and "on the fly."

In each of these tests, measured gamma-ray data and measured neutron data are obtained by the gamma-ray detector 16 and the neutron detector 18, as indicated at step 92. As hereinabove described, this measured data may be related to the energy or count of the emissions emanating from the container 12, and may also be digitized by the analyzer 23 to develop the gamma-ray fingerprint and the neutron fingerprint for the container 12 to obtain the container gamma-ray and neutron fingerprints.

In another embodiment of the present invention, it is preferable that the container fingerprints be normalized, as indicated at step 94. To perform the normalizing step 94, the gamma-ray and neutron inspection day background fingerprints, which may be retrieved from the inspection day fingerprint database 34 or from temporary storage, are subtracted from the un-normalized gamma-ray and neutron container fingerprints obtained in performance of step 92 to obtain the normalized gamma-ray and neutron container fingerprints. If un-normalized container fingerprints are used, then the weapon fingerprint database 30 and the manifest fingerprint database 32 also should contain their respective un-normalized fingerprints described above.

The weapon test may be first performed. In the weapon test, the normalized container gamma-ray and neutron fingerprints obtained at step 94 are compared, as indicated at step 96, to the gamma-ray and neutron weapon fingerprints, or to each pair of gamma-ray and neutron fingerprints, in the weapon fingerprint database 30. A decision is then made at step 98 whether the container fingerprints heuristically match any one of weapon fingerprints in the weapon fingerprint database 30. If the result of the decision at step 98 indicates a heuristic match, the YES path is taken and the status 38 (FIG. 4) is returned, as indicated at step 100. If the result of the decision at step 98 does not indicate any match, the NO path is taken and another test performed.

The manifest test may be next performed. In the manifest test, the manifest database 28 is queried, as indicated at 102 using the container ID 50 of the container 12 to obtain the list of standardized commodity ID's 52 cross-referenced to the container ID 50 for each of the contents on the manifest for the container 12. Then, as indicated at 104, the manifest fingerprint database 32 is queried using each retrieved container ID 50 from the manifest database 28 to retrieve the fingerprint for each of the items which has been cross-referenced to each commodity ID 52 used in the query. The retrieved item fingerprints may then be combined to formulate "purported" gamma-ray and neutron fingerprints of the container 12.

Continuing with the manifest test, the normalized container fingerprints obtained at step 94 are compared, as indicated at step 106, with the purported fingerprints developed at step 104. A decision is then made at step 108 whether the container fingerprints heuristically match the purported fingerprints. If the result of the decision at step 108 indicates a heuristic match, the YES path is taken and the status 40 (FIG. 4) is returned, as indicated at step 110. Furthermore, at step 110, the certificate 48 may also be issued. If the result of the decision at step 108 does not indicate any match, the NO path is taken and another test performed.

The background radiation test may next be performed. In the background radiation test, the measured gamma-ray data and measured neutron data obtained at step 92 are compared, as indicated at step 112, to expected gamma-ray data and neutron data, which in a preferred embodiment of the present invention is obtained from the constituent gamma-ray data and neutron data of the inspection day gamma-ray and neutron fingerprints in the inspection day fingerprint database 34 or in temporary storage. A decision is then made at step 114 whether the measured gamma-ray and neutron data is anomalous to the expected gamma-ray and neutron data. If the result of the decision at step 114 indicates an anomaly, there is an indicum of the presence of radiation shielding material concealing illegitimate contents in the container 12. Accordingly, the YES path is taken and the status 42 (FIG. 4) is returned, as indicated at step 116. If the result of the decision at step 114 does not indicate any anomaly, the NO path is taken and another test performed.

In one embodiment of the present invention, the anomaly is indicated when the measured gamma-ray data is substantially less than the constituent gamma-ray data of the inspection day gamma-ray background fingerprint and the measured neutron data is substantially greater than the constituent neutron data of the inspection day neutron background fingerprint. Otherwise, if both the measured gamma-ray and neutron data are substantially commensurate with their respective constituent gamma-ray and neutron data of the inspection day background fingerprint, for example the deviation being insubstantial, then no such anomaly is indicated.

If the container 12 contains all legitimate contents, the measured gamma-ray and neutron data and the inspection day gamma-ray and neutron data should be substantially similar to each other thereby indicating that shielded illegitimate content is not present. Irrespective of whether the legitimate contents include any significant gamma-ray or neutron sources such as smoke detectors or other legitimate radiation sources or do not include any significant gamma-ray or neutron sources, the container 12 would pass inspection by the previously performed manifest test above described. Similarly, if the container 12 contained a significant source of gamma-ray or neutron emissions from any unshielded illegitimate content such illegitimate source would have been detected by the weapon test above described.

However, if any illegitimate content is shielded by radiation shielding material, such as lead or concrete, the background gamma rays normally passing upward through the container 12 toward the gamma-ray detector 16 will be suppressed. Accordingly, the measured gamma-ray data of the container 12 will be substantially less than the constituent gamma-ray data of the inspection day gamma-ray background fingerprint. Furthermore, some of the neutrons emanating from illegitimate content will pass through the shielding material and be detected by the neutron detector 18 and the shielding material will cause the background neutrons will be backscattered in greater numbers toward the neutron detector 18. Accordingly, the measured neutron data of the container 12 will be substantially higher than the constituent neutron data of the inspection day neutron background fingerprint. This inverse divergence or ratio of the measured gamma-ray data to the constituent inspection day gamma-ray data and the measured neutron data to the constituent inspection day neutron data is, in one embodiment of the present invention, the indicum that the container 12 potentially contains radiation shielding material that shields illegitimate content, such as radioactive material or a nuclear weapon.

It should be understood that at this point in the operation, there has been a determination whether the suspect container contains (1) a nuclear weapon; or, (2) contents as listed on the manifest; or, (3) radiation shielding material. If none of these potential contents have been determined to be in the container, then the process can stop and the certificate 48 can issue.

The final test is the equivalence radiation test. In the equivalence radiation test, the container fingerprints obtained at step 92 are compared, as indicated at step 118, to the entire contents of the manifest fingerprint database 32. A decision is then made at step 120 whether the container fingerprints heuristically match any fingerprint in the manifest fingerprint database 32. If the result of the decision at step 120 indicates a heuristic match, the YES path is taken and the status 44 (FIG. 4) is returned, as indicated at step 122.

If the result of the decision at step 120 does not indicate any match, the NO path is taken and the status 46 (FIG. 4) is returned, as indicated at step 124. One possible subsequent action after a return of the status 46 is to move the container to a secure location and perform a manual inspection of the container.

In the ordinary course of business, shipping companies and their agents will advise container shippers that if the container 12 contains radioactive material, it will automatically be physically inspected before loading. Vice versa, in the ordinary course of business, legitimate shippers will advise the shipping company or agent that their particular container shipment contains radioactive material and will need pre-loading physical inspection.

There has been described hereinabove a novel method for detecting radiation or radiation shielding material in containers. Those skilled in the art may now make numerous uses of, and departures from, the hereinabove described embodiments without departing from the inventive principles disclosed herein. Accordingly, the present invention is to be defined solely by the lawfully permissible scope of the appended Claims.

DEFINITION OF CERTAIN WORDS, TERMS OR PHRASES USED

"Container." As used in this written description, "container" means any kind of a receptacle, such as a box, caton, can, or jar, in which material may held or carried. A "shipping container" is a container that has been standardized for efficient land and ocean-going shipping and handling. In FIGS. 1 and 2, a "shipping container" 12 is shown. "Container" includes, but is not limited to, truck trailers, railcars, airfreight containers, luggage and the like.

"Digitize." As used in this written description, "to digitize" means to transform analog data into digital form.

"Digitized gamma-ray data." As used in this written description, digitized gamma-ray data means any measurement or record of gamma rays emitted by matter that has been digitized.

"Digitized neutron data." As used in this written description, digitized neutron data means any measurement or record of neutrons emitted by matter which has been digitized.

"Energy of each gamma ray." As used in this written description, "energy of each gamma ray" means the energy of the deposit of radiation as the gamma ray stops or is absorbed by matter, in general, and by matter that detects gamma radiation, in particular. For example, as gamma rays pass through a sodium iodide (NaI) detector, the energy of each such gamma ray is absorbed by the NaI crystal. This energy is "re-radiated" in the visual spectrum which a photomultiplier detects and turns into an electrical signal. For a solid state detector like Cadmium Telluride (CdTe), the gamma-ray energy is absorbed by CdTe and then released directly as an electric signal. The electrical signal strength is directly proportional to the energy of the gamma ray.

"Energy of each neutron." As used in this written description, "energy of each neutron" means the energy of the deposit of radiation as the neutron stops, is absorbed by or passes through matter, in general, and by matter that detects neutrons, in particular. For example, as neutrons pass through a detector tube filled with gas, say BF3 or Helium-3, the alpha particle carries away the bulk of the energy and produces secondary ionizations in the gas. The ionizing radiations generate a pulse of the same height. Gas-filled detectors operated at lower voltage ranges turn the tube into an "ionization chamber" or "proportional counter," where there is a relationship between the energy of the ionizing particle and the energy of the pulse. The electrical signal strength is directly proportional to the energy of the neutron and thus both count and energy levels can be recorded.

"Gamma-ray fingerprint." As used in this written description, a "gamma-ray fingerprint" means gathered and digitized gamma-ray data emitted from a container and its contents, if any. Compare, "neutron fingerprint" which means gathered and digitized neutron data emitted from a container and its contents, if any; or "radiation fingerprint" which means gathered and digitized radiation data emitted from a container and its contents, if any, and includes both gamma-ray and neutron fingerprints. Radiation fingerprints may be represented as a spectrum, spectrogram or spectrograph. Modernly, some scientists refer to gamma-ray, neutron or radiation "figerprints" as gamma-ray, neutron or radiation "templates."

"Heuristically match" or "To heuristically match." As used in this written description, "to heuristically match" means to compare patterns of digitized data, determine their similarity with a high degree of certainty while not requiring an exact match. A "heuristic match" is the result of heuristically matching.

"Illegitimate content." As used in this written description, "illegitimate content" means the impermissible content of radioactive or fissile material of a container that may not be lawfully transported.

"Intensity or count of the source of the gamma rays" or "intensity of gamma-ray emissions" or "intensity of gamma-ray data." As used in this written description, "intensity of the source of the gamma rays" or "intensity of gamma-ray emissions" or "intensity of gamma-ray data" means the number or count of detected gamma rays emitted by a particular radioactive material per unit of time.

"Intensity or count of the source of the neutrons" or "intensity of neutron emissions" or "intensity of neutron data." As used in this written description, "intensity of the source of the neutrons" or "intensity of neutron emissions"

or "intensity of neutron data" means the number or count of detected neutrons emitted by a particular radioactive material per unit of time.

"Legitimate content." As used in this written description, "legitimate content" means the contents of a container that may be lawfully transported.

"Neutron fingerprint." As used in this written description, a "neutron fingerprint" means gathered and digitized neutron data emitted from a container. Compare, "gamma-ray fingerprint" which means gathered and digitized gamma-ray data emitted from a container; or "radiation fingerprint" which means gathered and digitized radiation data emitted from a container and includes both gamma-ray and neutron fingerprints. Radiation fingerprints may be represented as a spectrum, spectrogram or spectrograph. Modernly, some scientists refer to gamma-ray, neutron or radiation "fingerprints" as gamma-ray, neutron or radiation "templates."

"Spectrogram." As used in this written description, "spectrogram" means a graphic or photographic representation of a spectrum. As used in this written description, "spectrograph," "spectrum" and "spectrogram" are synonymous. Digitized spectrographs, spectra or spectrograms can be displayed on computer monitors.

"Spectrographically analyze." As used in this written description, "spectrographically analyze" means to analyze data represented as a spectrogram.

"Substantially lower than the inspection day background fingerprint." As used in this written description, "substantially lower than the inspection day background fingerprint" means lower to the extent that one could reasonably conclude that the gamma-ray detection device is gathering shielded background gamma-ray data.

"Substantially higher than the inspection day background fingerprint." As used in this written description, "substantially higher than the inspection day background fingerprint" means higher to the extent that one could reasonably conclude that the neutron detection device is gathering neutrons from a radioactive source and neutrons backscattered from material designed to shield gamma rays.

What is claimed as the invention is:

1. A method to determine the presence of radiation shielding material concealing illegitimate content in a container comprising steps of:
    obtaining each of measured gamma-ray data and measured neutron data from said container; and
    comparing each of said measured gamma-ray data and said measured neutron data to a respective one of expected gamma-ray data and expected neutron data wherein an anomaly between one of said measured gamma-ray and said expected gamma-ray data and said measured neutron data and said expected neutron data is an indicum of the presence of said material shielding said content.

2. A method as set forth in claim 1 wherein said expected gamma-ray and neutron data is background gamma-ray and neutron data.

3. A method as set forth in claim 2 wherein said background gamma-ray data and said background neutron data are respectively inspection day background gamma-ray data and inspection day background neutron data.

4. A method as set forth in claim 3 wherein said inspection day background gamma-ray data and said inspection day background neutron data are constituents of stored inspection day background fingerprints obtained for said container.

5. A method as set forth in claim 3 wherein said anomaly exists when said measured gamma-ray data is substantially less than said inspection day background gamma-ray data and said measured neutron data is substantially greater than inspection day background neutron data.

6. A method as set forth in claim 2 wherein said anomaly exists when one of said measured gamma-ray data substantially decreases from said expected gamma-ray data and said measured neutron data substantially increases from said background neutron data.

7. A method as set forth in claim 1 wherein said gamma-ray data and said neutron data are a selected respective one of a count of said gamma-ray emissions and said neutron emissions and an energy of said gamma-ray emissions and said neutron emissions.

8. A method as set forth in claim 1 wherein each of said measured gamma-ray data, said measured neutron data, said expected gamma-ray data and said expected neutron data is digitized data.

9. A method as set forth in claim 1 wherein said obtaining step is performed while said container is engaged by a hoist attachment, said hoist attachment including a gamma-ray detector and a neutron detector arranged proximal to said container to develop said measured gamma-ray data and said measured neutron data from detected gamma-ray emissions and neutron emissions emanating from said container when said container is engaged by said hoist attachment.

10. A method as set forth in claim 9 wherein said hoist attachment further includes a housing in which said gamma-ray detector and said neutron detector are disposed, said housing isolating said gamma-ray detector and said neutron detector from mechanical shock induced in said hoist attachment.

11. A method as set forth in claim 10 wherein said hoist attachment further includes an analyzer disposed in said housing to digitize each of said measured gamma-ray data and said measured neutron data.

12. A method as set forth in claim 1 further comprising the step of returning a status to signal said indicum.

13. A method as set forth in claim 1 wherein said measured gamma-ray and measured neutron data being substantially commensurate with said expected gamma-ray and said expected neutron data is an indicum of the presence of legitimate content in said container.

14. A computer readable medium containing executable code operable to detect the presence of radiation shielding material concealing illegitimate content in a container, said code implementing procedures of:
    obtaining each of measured gamma-ray data and measured neutron data from said container; and
    comparing each of said measured gamma-ray data and said measured neutron data to a respective one of expected gamma-ray data and expected neutron data wherein an anomaly between one of said measured gamma-ray and said expected gamma-ray data and said measured neutron data and said expected neutron data is an indicum of the presence of said material shielding said content.

15. A computer readable medium as set forth in claim 14 wherein said expected gamma-ray and neutron data is background gamma-ray and neutron data.

16. A computer readable medium as set forth in claim 15 wherein said background gamma-ray data and said background neutron data are respectively inspection day background gamma-ray data and inspection day background neutron data.

17. A computer readable medium as set forth in claim 16 wherein said inspection day background gamma-ray data and said inspection day background neutron data are constituents of stored inspection day background fingerprints obtained for said container.

18. A computer readable medium as set forth in claim 16 wherein said anomaly exists when said measured gamma-ray data is substantially less than said inspection day background gamma-ray data and said measured neutron data is substantially greater than inspection day background neutron data.

19. A computer readable medium as set forth in claim 15 wherein said anomaly exists when one of said measured gamma-ray data substantially decreases from said expected gamma-ray data and said measured neutron data substantially increases from said background neutron data.

20. A computer readable medium as set forth in claim 14 wherein said gamma-ray data and said neutron data are a selected respective one of a count of said gamma-ray emissions and said neutron emissions and an energy of said gamma-ray emissions and said neutron emissions.

21. A computer readable medium as set forth in claim 14 wherein each of said measured gamma-ray data, said measured neutron data, said expected gamma-ray data and said expected neutron data is digitized data.

22. A computer readable medium as set forth in claim 14 wherein said obtaining step is performed while said container is engaged by a hoist attachment, said hoist attachment including a gamma-ray detector and a neutron detector arranged proximal to said container to develop said measured gamma-ray data and said measured neutron data from detected gamma-ray emissions and neutron emissions emanating from said container when said container is engaged by said hoist attachment.

23. A computer readable medium as set forth in claim 22 wherein said hoist attachment further includes a housing in which said gamma-ray detector and said neutron detector are disposed, said housing isolating said gamma-ray detector and said neutron detector from mechanical shock induced in said hoist attachment.

24. A computer readable medium as set forth in claim 23 wherein said hoist attachment further includes an analyzer disposed in said housing to digitize each of said measured gamma-ray data and said measured neutron data.

25. A computer readable medium as set forth in claim 14 further comprising the step of returning a status to signal said indicum.

26. A computer readable medium as set forth in claim 14 wherein said measured gamma-ray and measured neutron data being substantially commensurate with said expected gamma-ray and said expected neutron data is an indicum of the presence of legitimate content in said container.

27. An apparatus to determine the presence of radiation shielding material concealing illegitimate content in a container comprising:
a gamma-ray detector and a neutron detector respectively operable to obtain each of measured gamma-ray data and measured neutron data from said container; and
a computer operable to compare each of said measured gamma-ray data and said measured neutron data to a respective one of expected gamma-ray data and expected neutron data wherein an anomaly between one of said measured gamma-ray and said expected gamma-ray data and said measured neutron data and said expected neutron data is an indicum of the presence of said material shielding said content.

28. An apparatus as set forth in claim 27 wherein said expected gamma-ray and neutron data is background gamma-ray and neutron data.

29. An apparatus as set forth in claim 28 wherein said background gamma-ray data and said background neutron data are respectively inspection day background gamma-ray data and inspection day background neutron data.

30. An apparatus as set forth in claim 29 further comprising an inspection day background fingerprint database containing inspection day background fingerprints obtained for said container, said inspection day background gamma-ray data and said inspection day background neutron data being constituents of stored inspection day background fingerprints.

31. An apparatus as set forth in claim 29 wherein said anomaly exists when said measured gamma-ray data is substantially less than said inspection day background gamma-ray data and said measured neutron data is substantially greater than inspection day background neutron data.

32. An apparatus as set forth in claim 28 wherein said anomaly exists when one of said measured gamma-ray data substantially decreases from said expected gamma-ray data and said measured neutron data substantially increases from said background neutron data.

33. A method as set forth in claim 27 wherein said gamma-ray data and said neutron data are a selected respective one of a count of said gamma-ray emissions and said neutron emissions and an energy of said gamma-ray emissions and said neutron emissions.

34. An apparatus as set forth in claim 27 wherein each of said measured gamma-ray data, said measured neutron data, said expected gamma-ray data and said expected neutron data is digitized data.

35. An apparatus as set forth in claim 27 wherein said container is engaged by a hoist attachment, said a gamma-ray detector and a neutron detector being carried by said hoist attachment proximal to said container to develop said measured gamma-ray data and said measured neutron data from detected gamma-ray emissions and neutron emissions emanating from said container when said container is engaged by said hoist attachment.

36. An apparatus as set forth in claim 35 further comprising a housing in which said gamma-ray detector and said neutron detector are disposed, said housing being carried by said hoist attachment and isolated therefrom to isolate said gamma-ray detector and said neutron detector from mechanical shock induced in said hoist attachment.

37. An apparatus as set forth in claim 36 further comprising an analyzer disposed in said housing to digitize each of said measured gamma-ray data and said measured neutron data.

38. An apparatus as set forth in claim 27 wherein said computer is further operative to return a status to signal said indicum.

39. An apparatus as set forth in claim 27 wherein said measured gamma-ray and measured neutron data being substantially commensurate with said expected gamma-ray and said expected neutron data is an indicum of the presence of legitimate content in said container.

40. A method of inspecting a container for a presence of illegitimate content comprising steps of:
obtaining each of measured gamma-ray data and measured neutron data from said container to obtain a respective one of a container gamma-ray fingerprint and a container neutron fingerprint for said container;
comparing each of said container gamma-ray fingerprint and said container neutron fingerprint to each one of a plurality of pairs of a weapon gamma ray fingerprint and a weapon neutron fingerprint wherein a heuristic match between said container gamma-ray fingerprint and said container neutron fingerprint and one of said pairs of said weapon gamma ray fingerprint and said weapon neutron fingerprint is an indicum of said presence of illegitimate content; and comparing, in the event said indicum of said presence of illegitimate content is null, each of said measured gamma-ray data and said measured neutron data to a respective one of expected gamma-ray data and expected neutron data wherein an anomaly between one of said measured gamma-ray and said expected gamma-ray data and said measured neutron data and said expected neutron data is an indicum of the presence of radiation shielding material concealing said illegitimate content.

41. A method as set forth in claim 40 further comprising the step of constructing a weapon fingerprint database, said pairs of said weapon gamma ray fingerprint and said weapon neutron fingerprint being stored in said weapon fingerprint database.

42. A method as set forth in claim 41 wherein for each one of said pairs of said weapon gamma ray fingerprint and said weapon neutron fingerprint said constructing step includes the steps of:

developing gamma ray data and neutron data from a test container containing a sample of a known radioactive material;

digitizing said data to develop said one of said pairs of said weapon gamma ray fingerprint and said weapon neutron fingerprint; and storing said one of said pairs of said weapon gamma ray fingerprint and said weapon neutron fingerprint in said weapons fingerprint database.

43. A method as set forth in claim 42 wherein said one of said pairs is cross-referenced to said sample in said weapon fingerprint database.

44. A method as set forth in claim 42 further comprising the step of normalizing said one of said pairs of said weapon gamma ray fingerprint and said weapon neutron fingerprint.

45. A method as set forth in claim 44 wherein said normalizing step includes the steps of:

developing gamma ray data and neutron data from an empty test container;

digitizing said data from said empty container to develop a background gamma-ray fingerprint and a background neutron fingerprint; and subtracting said background gamma-ray fingerprint and said background neutron fingerprint from said weapon gamma ray fingerprint and said weapon neutron fingerprint in each one of said pairs.

46. A method as set forth in claim 40 further comprising the step of comparing each of said container gamma-ray fingerprint and said container neutron fingerprint respectively to a purported gamma-ray fingerprint and a purported neutron fingerprint wherein a heuristic match between said container gamma-ray fingerprint and said container neutron fingerprint and said purported gamma-ray fingerprint and said purported neutron fingerprint is an indicum that said container contains legitimate contents, said measured data comparing step being performed in the event said indicum of said presence of legitimate content is null.

47. A method as set forth in claim 46 further comprising the steps of:

querying a manifest database with a container ID of said container to obtain each commodity ID of each item purported to be in said container; and querying a manifest fingerprint database containing a gamma-ray fingerprint and a neutron fingerprint for each commodity ID, said purported gamma-ray fingerprint and said purported neutron fingerprint being combined from each of said gamma-ray fingerprint and said neutron fingerprint for each commodity ID.

48. A method as set forth in claim 47 wherein said manifest database is a manifest electronic file maintained by customs authorities, a terminal operator or a transport company.

49. A method as set forth in claim 47 further comprising the step of constructing said manifest fingerprint database.

50. A method as set forth in claim 49 wherein for each commodity ID said constructing step includes the steps of:

developing gamma ray data and neutron data from a test container containing an item of known legitimate contents;

digitizing said data to develop said manifest gamma ray fingerprint and said manifest neutron fingerprint for said item; and storing said manifest gamma ray fingerprint and said manifest neutron fingerprint in said manifest fingerprint database.

51. A method as set forth in claim 50 wherein said manifest gamma ray fingerprint and said manifest neutron fingerprint is cross-referenced to said commodity ID for said item.

52. A method as set forth in claim 50 further comprising the step of normalizing said manifest gamma ray fingerprint and said manifest neutron fingerprint.

53. A method as set forth in claim 52 wherein said normalizing step includes the steps of:

developing gamma ray data and neutron data from an empty test container;

digitizing said data from said empty container to develop a background gamma-ray fingerprint and a background neutron fingerprint; and subtracting said background gamma-ray fingerprint and said background neutron fingerprint from said manifest gamma ray fingerprint and said manifest neutron fingerprint.

54. A method as set forth in claim 40 further comprising normalizing said container gamma-ray fingerprint and said container neutron fingerprint to develop respectively a normalized container gamma-ray fingerprint and a normalized container neutron fingerprint.

55. A method as set forth in claim 54 wherein said normalizing step includes the steps of:

developing gamma ray data and neutron data from an empty test container on the day said container is to be inspected;

digitizing said data from said empty container to develop an inspection day background gamma-ray fingerprint and an inspection day background neutron fingerprint; and subtracting said inspection day background gamma-ray fingerprint and said inspection day background neutron fingerprint from said container gamma ray fingerprint and said container neutron fingerprint.

* * * * *